United States Patent
Wallace et al.

(10) Patent No.: US 6,463,272 B1
(45) Date of Patent: Oct. 8, 2002

(54) LOCATION REPORTING PAGER

(75) Inventors: David W. Wallace, Mesa, AZ (US); Christopher M. Moropoulos, San Carlos, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/217,916

(22) Filed: Dec. 21, 1998

(51) Int. Cl.$^7$ .......................... H04M 11/00; H04Q 7/20
(52) U.S. Cl. ............................... 455/404; 455/456
(58) Field of Search ........................ 455/404, 456, 455/457, 403; 340/539, 426; 342/357.09, 357.07; 701/213

(56) References Cited

U.S. PATENT DOCUMENTS

| | | | |
|---|---|---|---|
| 4,577,060 A | * 3/1986 | Webb et al. ............... | 455/31.2 |
| 4,871,997 A | * 10/1989 | Adriaenssens et al. ...... | 340/539 |
| 5,365,451 A | 11/1994 | Wang et al. | |
| 5,418,537 A | * 5/1995 | Bird ...................... | 342/357.09 |
| 5,490,200 A | 2/1996 | Snyder et al. | |
| 5,491,486 A | 2/1996 | Wells, II et al. | |
| 5,504,491 A | * 4/1996 | Chapman ............... | 342/357.09 |
| 5,588,038 A | * 12/1996 | Snyder .................. | 455/31.3 |
| 5,594,425 A | 1/1997 | Ladner et al. | |
| 5,608,412 A | 3/1997 | Welles, II et al. | |
| 5,625,668 A | 4/1997 | Loomis et al. | |
| 5,630,206 A | 5/1997 | Urban et al. | |
| 5,682,139 A | 10/1997 | Pradeep et al. | |
| 5,686,888 A | 11/1997 | Welles, II et al. | |
| 5,686,910 A | 11/1997 | Timm et al. | |
| 5,691,980 A | 11/1997 | Welles, II et al. | |
| 5,703,598 A | * 12/1997 | Emmons ................ | 342/357.07 |
| 5,742,233 A | 4/1998 | Hoffman et al. | |
| 5,748,147 A | 5/1998 | Bickley et al. | |
| 5,777,580 A | 7/1998 | Janky et al. | |
| 5,917,405 A | * 6/1999 | Joao ..................... | 340/426 |
| 5,983,074 A | * 11/1999 | Jansen .................. | 455/31.3 |
| 6,044,257 A | * 3/2000 | Boling et al. ........... | 455/404 |
| 6,084,510 A | * 7/2000 | Lemelson et al. ........ | 340/539 |
| 6,112,074 A | * 8/2000 | Pinder .................. | 455/404 |
| 6,115,605 A | * 9/2000 | Siccardo ................ | 455/426 |
| 6,122,520 A | * 9/2000 | Want et al. ............. | 455/456 |
| 6,122,521 A | * 9/2000 | Wilkinson et al. ....... | 455/457 |
| 6,131,067 A | * 10/2000 | Girerd et al. ........... | 701/213 |

\* cited by examiner

*Primary Examiner*—Nguyen T. Vo
(74) *Attorney, Agent, or Firm*—Trop, Pruner & Hu, P.C.

(57) ABSTRACT

A pager includes a global positioning system receiver so that the pager may be interrogated by a remote requester for the user's current location. The information can be provided to the requester in response to a request made over the Internet. The requester can be queried for authentication information before providing the information. In this way, the positioning information may be obtained automatically without requiring any action on the part of the pager owner.

7 Claims, 4 Drawing Sheets

LOCATION REPORTING PAGER

BACKGROUND

The invention relates generally to pagers.

Pagers are generally worn by a user and allow either one-way or two-way communications. With one-way communication, the user may receive an audible or vibratory indication that someone is trying to reach him or her. Some pagers also allow for messaging so that the user may receive an actual phone number or even a text message. Two-way pagers allow the pager user to send communications to other parties.

Some pagers enable contact through the Internet. A person may access a web site and send a message addressed to a pager by typing a message into the web site and identifying the pager. The message is automatically transmitted to the identified pager.

There are a number of instances where it is very desirable to locate a particular person. It may be advantageous in keeping track of a number of workers to be able to know at any particular time where those workers are. In some cases, it may be desirable for parents to keep track of where their children are. In other cases, it may be a benefit in situations where a person could become lost.

In many of these cases it may be desirable that the user be located without actually telling the user that the user is being located. For example, if the user has disappeared, has been kidnapped, or has been injured, it may be desirable to locate the user even though the user does not or cannot respond to a page. In other cases the user may prefer not to be bothered with location requests.

SUMMARY

In accordance with one embodiment, a pager includes a global positioning system receiver and a transceiver. The transceiver is coupled to the receiver to transmit global positioning system coordinates of the receiver.

DETAILED DESCRIPTION

Figure 1:
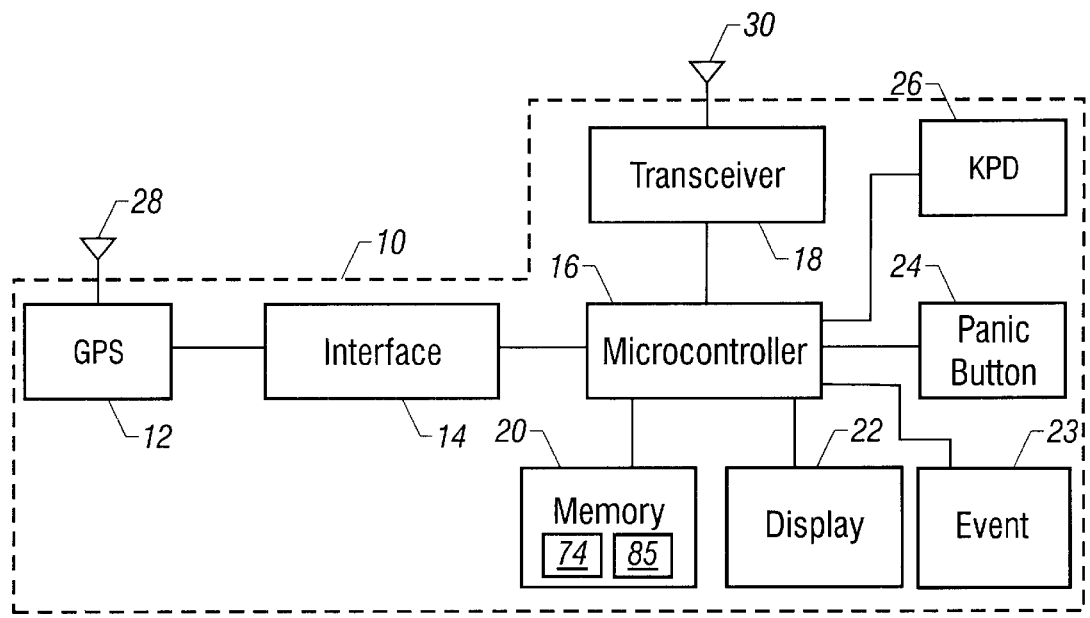
FIG. 1 is a block diagram depiction of a pager in accordance with one embodiment of the present invention.

Referring to FIG. 1, a two-way pager 10 may include a global positioning system (GPS) antenna 28. The GPS antenna 28 provides a GPS positioning signal to a (GPS) receiver 12. The receiver 12 communicates with a controller 16 through an interface 14. The interface 14 could, for example, be an RS-232 or IEEE 488 adapter. The controller 16, which may be a microcontroller, may be responsible for receiving the global positioning coordinates developed by the receiver 12 and providing them to the transceiver 18 for broadcast from the antenna 30.

The controller 16 includes a memory 20 which may include software 74 for implementing the features associated with the pager 10. The controller 16 may also control a display 22 which could, for example, be a liquid crystal display. As an example, the display 22 is controllable by the controller 16 to display a map showing the pager's position. In addition, the controller 16 may in fact interact with a keypad 26 which allows alphanumeric characters to be entered for transmission by the transceiver 18 or for other functions.

The microcontroller 16 may also communicate with an event generator 23. The event generator 23 may be responsible for receiving one or more inputs for keeping track of one or more events. The event generator 23 may also generate a signal to the controller 16 which may be in the form of an interrupt when a particular preprogrammed event is detected. Among the events that may be detected is acceleration of the pager 10, exceeding a low or high temperature set point, humidity, moisture, exceeding a time period for taking a particular action or for having an event occur, receiving a transmission, or other similar events.

In response to the receipt of an event from the event generator 23, the microcontroller 16 may take appropriate action. In one embodiment of the invention, the microcontroller 16 causes a message to be generated which defines the event and specifies the location where the pager was when the event occurred. This event information may be immediately transmitted to a base station or it may be stored and transmitted at a later time. For example, the pager 10 may transmit events periodically at predetermined times.

In addition, the event generator 23 may keep track of the GPS coordinates of the pager 10. If those coordinates deviate from the coordinates of a preprogrammed course or area, an event may be generated. For example, the user may input a predetermined path of travel. If the user substantially departs from that path of travel, an event may be generated causing a transmission to occur. For example, if the user is kidnapped, a signal may be automatically generated once the user departs from the preprogrammed path. Similarly, if the pager 10 is associated with an article, such as a container in the course of shipping, if the container takes a course which is not within the preprogrammed specifications, an event may be generated.

The generated events may result in immediate transmission or, as described above, these transmissions may occur at periodic intervals. As still another alternative, the microcontroller 16 may store the information about the events and may transmit the information when a request is received by the GPS receiver 12, for example from a base station.

The controller 16 also controls a panic feature which may be implemented by operating a panic operator such as a panic button 24. When a panic button is operated, the controller, in accordance with software that may be stored in the memory 20, automatically transmits the global positioning system coordinates of the pager 10. This transmission may also include an identifier for the particular pager 10 and an indicator of the condition that has been encountered or, in general, that an emergency has arisen.

Figure 2:
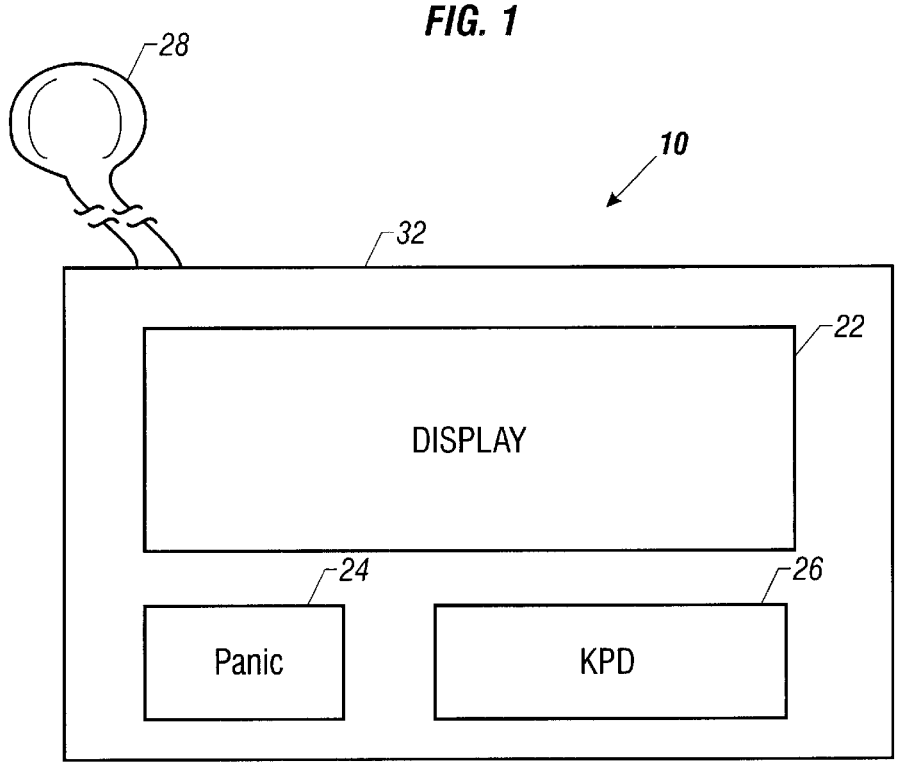
FIG. 2 is a top plan view of the housing for the pager shown in FIG. 1.

Referring to FIG. 2, one exemplary housing 32 for implementing the embodiment shown in FIG. 1 includes a display 22. The keypad 26 and a panic button 24 may be provided adjacent to the display 22. A global positioning system antenna 28 may be connected to the housing 32.

The pager 10 may be battery powered and may include a backup battery in case the main battery fails. A low battery report may be transmitted to alert others that imminent battery failure may occur. This low battery information may also be used to transition the pager to a sleep mode. The pager may be automatically awoken at a preset time or after the expiration of a given time period. Once transitioned out of the sleep mode, the pager may automatically transmit new position information.

In the sleep mode the microcontroller, the display and other components may transition to a reduced power consumption mode. However, the receiver is always ready to receive a message. The power down cycle may be triggered by a lack of activity for a given time. Also, the power down device may be automatically, periodically powered up.

Figure 6:
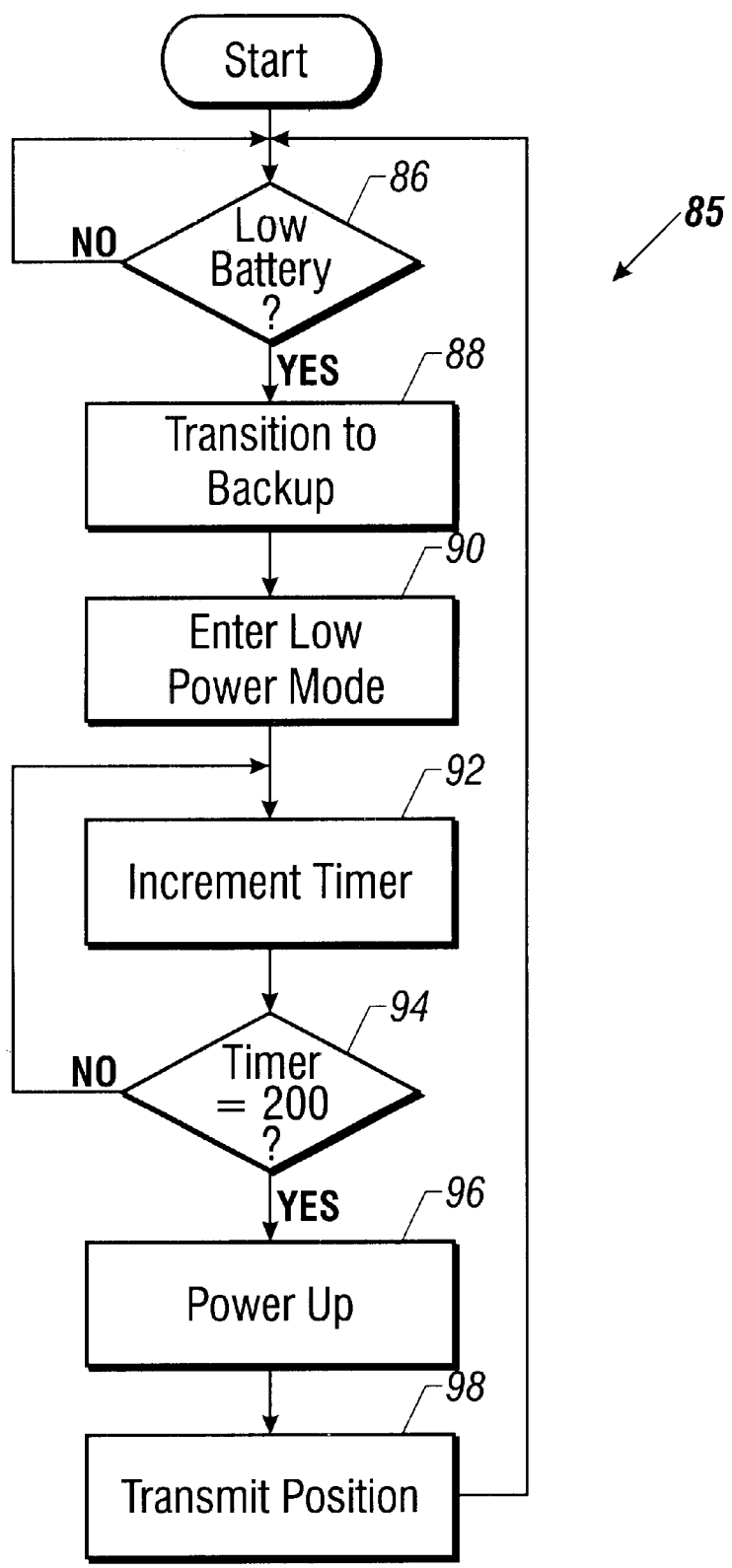
FIG. 6 is a flow chart showing software for implementing a power down mode.

Referring to FIG. 6, software 85 may be stored in the memory 20 to implement a power saving mode. If a lower battery condition is detected (diamond 86), the system may activate a backup battery (block 88). The pager may then automatically transition to a low power mode, as indicated in block 90. In this state transmission and receipt of messages and operation of the display may be suspended.

A timer may be incremented (block 92) until a given time period has passed (diamond 94). The pager may then be automatically powered up (block 96) to transmit a position message (block 98). Thereafter the pager may be automatically transitioned back to the low power mode (block 90).

Figure 3:
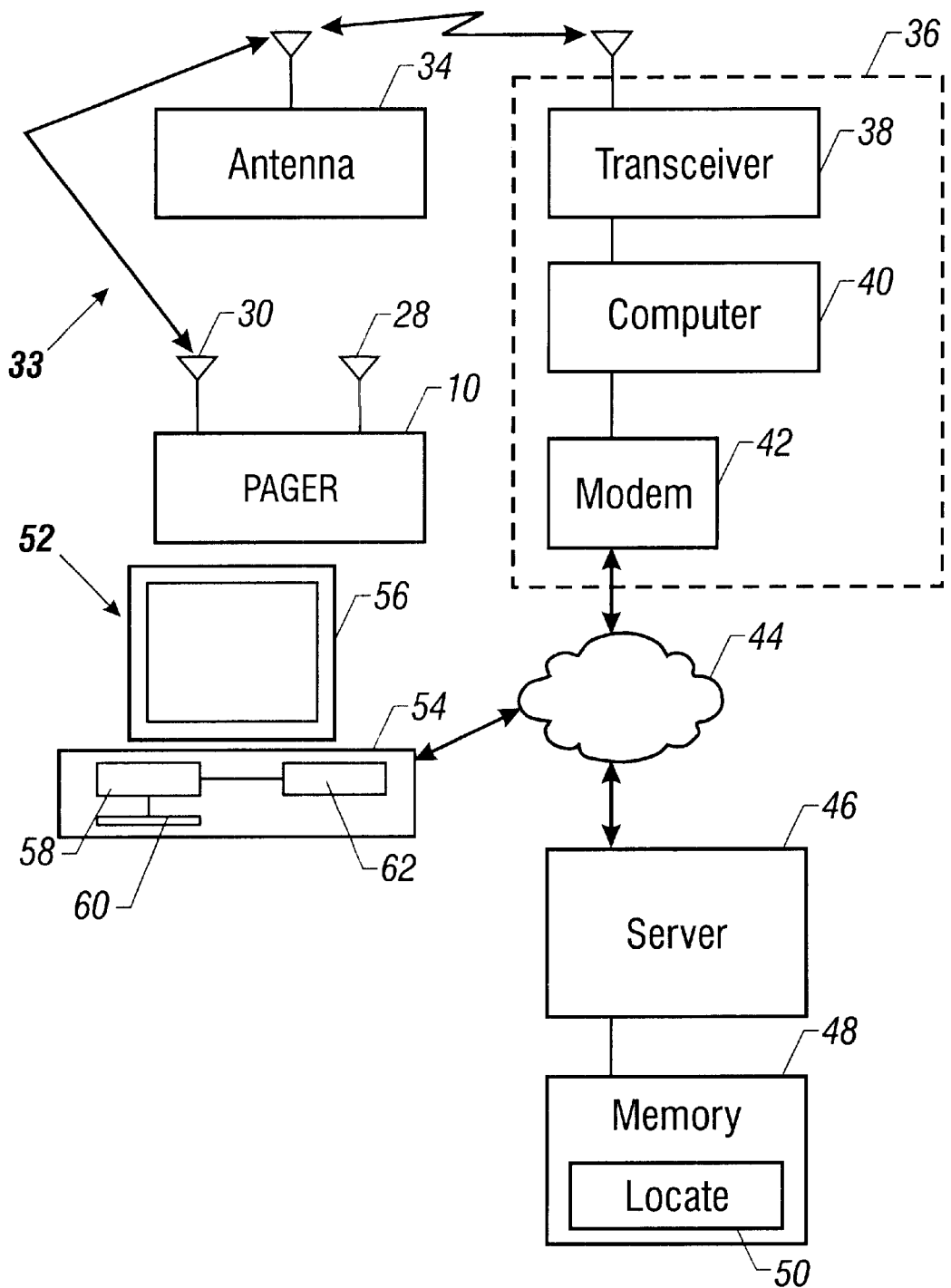
FIG. 3 is a block diagram depiction of a pager system that could be used in connection with the pager shown in FIG. 1.

Moving now to FIG. 3, a paging system 33 which uses the pager 10 may also include one or more antennas 34 which are associated with a conventional paging system. The antennas 34 transmit page messages to pagers 10 in the vicinity of the antenna 34. In most page systems, a large number of antennas 34 are distributed throughout any given area and across the country. The pager 10 may be a two-way pager which communicates with the antenna by sending and receiving messages from the antenna 34 which happens to be proximate to the pager 10 at any particular time.

The antenna 34 then repeats the messages it receives from pagers and forwards them to a paging central station 36. The central station 36 may include a transceiver 38, a computer 40 and a modem 42.

The modem 42, under the control of computer 40, may access information over the Internet 44. For example, a server 46 coupled to the Internet 44 may be associated with memory 48 and software 50. The server 46 may also be contacted by a remote computer 52 using a computer having a display screen 56 and a computer housing 54. The computer housing 54 may contain a processor 58, a modem 62 and a memory 60 connected in a conventional fashion. The user of the computer 52 may query an Internet web site to send page messages to any particular pager 10. One may also request position information for a particular pager. When a request for position information is sent over the Internet 44 from a computer 52, it is processed by the server 46 using resident memory 48 and software 50. The server 46 may access the modem 42 and send a message from the station 36 to the antenna 34 to locate the pager 10.

A variety of pager location systems may be utilized. In some systems, the pager may need to periodically transmit its position so that the system can locate it. In other systems, a message may be sent throughout the area in which the pager might be found so that wherever the pager is, it receives a message.

Thus the server 46 determines the pager's position by prompting the pager to send a message containing its global position system coordinates. These coordinates may then be provided to the computer 52 if appropriate authentication is provided.

To facilitate the use of the information by the computer 52, the server 46 may provide the global positioning system information in the form of a map showing the current position of the pager 10. Alternatively, the server 46 can provide appropriate information and the position may then be displayed on a map using software contained in the memory 60 of the computer system 52.

Since the pager 10 is always "on", the system 33 can always locate the pager whether or not the pager owner actually knows that he or she is being located. In some cases, the pager owner 10 may limit the persons who have access to the location information. This function may be policed by the server 46 which includes a database of authorized users contained in the memory 48. Only if one of these users, presenting appropriate authentication, inquires of the location of the pager 10, is the mapping information provided by the server 46.

Figure 4:
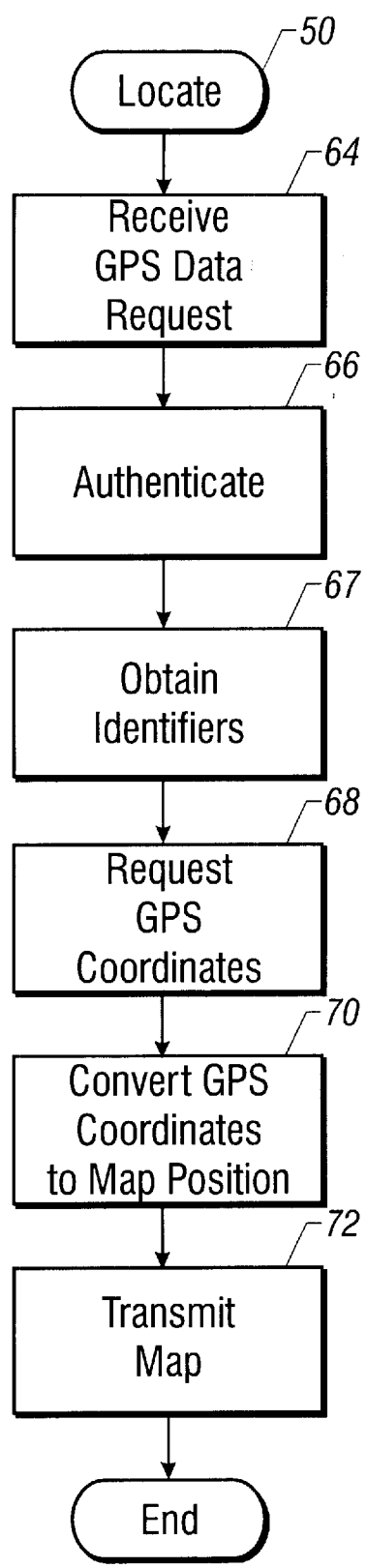
FIG. 4 is a flow chart for software which may be utilized by the system shown in FIG. 3.

Referring now to FIG. 4, the software 50 executable in the server 46 for operating the system 33 initially receives a request for GPS data (block 64). This request is authenticated as indicated in block 66 to ensure that the inquiring party is authorized to receive information about the particular pager. Once authenticated, a party may communicate with the pager 10. If the party is authorized to receive the information, the appropriate identifiers for the particular pager which is the subject of the request are obtained (block 67) and the GPS coordinates are requested from the central station 36, as indicated in block 68. The central station 36 then uses conventional technology to locate the appropriate antenna 34 to communicate with the pager 10.

When the GPS coordinates are received, the coordinates are converted into a map position using the software contained in the memory 48, for example, as indicated in block 70. The map information is then transmitted back to the requesting party over the Internet as indicated in block 72.

Figure 5:
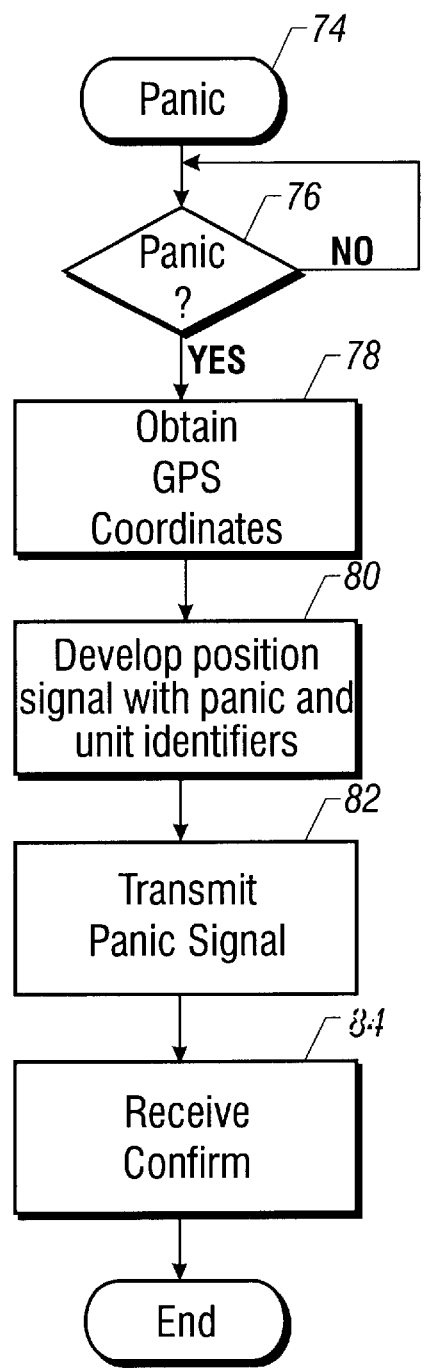
FIG. 5 is a flow chart showing software for implementing a panic feature in the pager of FIGS. 1 and 2.

Turning now to FIG. 5, the software 74 for implementing the panic function in the pager 10 initially determines whether the panic button 24 has been operated, as shown in diamond 76. When the button is operated, the GPS coordinates are immediately obtained from the GPS receiver 12, as indicated in block 78. A signal is produced by the transceiver 38 which may include an indicator that a panic condition has been encountered and identifiers for the particular pager involved. The panic signal is transmitted by the transceiver 18 as indicated in block 82. When the panic signal is received by the station 36, a panic condition is recognized and a confirmation may be sent back to the pager 10 through the antenna 34 to assure the pager owner that the message is being handled.

Through the provision of global positioning system information on a pager, the pager owner can always be contacted and his/her position determined without requiring any active involvement of the pager owner. This has a number of advantages in connection with locating persons who may not be able to respond. It may also be useful in locating objects or pets. In addition to the provision of the panic feature, the pager owner can initiate a transmission of his/her position so that the appropriate authority will be notified and provide assistance to the user. Because the user's position can be determined through an Internet access with appropriate authentication safeguards, it is possible for interested parties to easily and quickly determine a person's location without needing to bother the person with an inquiry.

In addition, the pager may include the ability to display a simple map depicting the user's present location. This position information may be displayed on the display 22. The user may be able to invoke the position map display by entering a command on the keypad 26. The data to create the map may be preloaded into the pager or it may be transmitted to the pager as a pager message. Alternatively, the proper map region, for the user's present position, may be sent in response to a position message.

The pager 10 may also be programmed to automatically report (by a page message) when it enters or leaves a particular zone. This message may be Internet accessible. This may be useful in keeping track of persons or objects. The pager 10 may also be programmed to automatically contact certain people when the pager enters a particular zone.

The pager 10 may also monitor other information such as temperature, altitude, moisture or acceleration and may transmit this information automatically or upon request. In addition, the pager 10 may interpolate its position using a digital accelerometer for example, when the pager is unable to obtain a good GPS position.

Other features may include a watch dog timer which automatically sends an alarm message if the user fails to periodically reset a timer. In addition, an alarm may be triggered if the pager is removed from the user without disabling the alarm, for example by entering a key sequence. For this purpose the pager housing may include a hinged clasp with a sensor to detect removal of the pager from the user's clothing.

The pager may be linked to a service desk which may provide position information on demand. The service desk may also attempt to contact the user when an emergency is indicated.

While the present invention has been described with respect to a limited number of embodiments, those skilled in the art will appreciate numerous modifications and variations therefrom. It is intended that the present invention encompass all such variations and modifications as fall within the true spirit and scope of the present invention.

What is claimed is:

1. A pager comprising:
    a global positioning system receiver; a transceiver coupled to said receiver to transmit global positioning coordinates of the receiver, said transceiver being operable to automatically transmit said coordinates when a request for the coordinates is received;
    an event generator coupled to said transceiver, said event generator to track the global positioning coordinates of said receiver such that when said tracked global positioning coordinates deviate from a set of preprogrammed coordinates said deviated coordinates are automatically transmitted by said transceiver;
    a power down device that transitions said pager into a sleep mode when a battery is low, said pager periodically awakening from said sleep mode to automatically transmit said global positioning coordinates of said receiver; and
    a user selectable panic operator, such that once the operator is operated, said transceiver automatically sends a message indicating that help is needed and including the coordinates of the global positioning system receiver.

2. The pager of claim 1 including a display controller.

3. The pager of claim 2 including a memory, said display controller adapted to display a map showing the receiver's location.

4. The pager of claim 1 wherein said message includes the global positioning system coordinates for the receiver.

5. The pager of claim 4 wherein said message includes an identifier for said pager.

6. The pager of claim 4 including a controller adapted to automatically obtain the global positioning system coordinates once said panic operator is operated and to transmit said message automatically.

7. A pager comprising:
    a transmitter to transmit signals to a receiving station;
    a panic operator operable to select a panic function, said panic function causing said transmitter to transmit a coded signal which may be recognized as a request for help together with the coordinates of the transmitter;
    a global positioning system receiver connected to said transmitter, said transmitter adapted to transmit the global positioning system coordinates of the pager at the time when the panic operator is operated;
    an event generator coupled to said global positioning system receiver, said event generator to track the global positioning system coordinates of said receiver such that when said tracked global positioning coordinates deviate from a set of preprogrammed coordinates said deviated coordinates are automatically transmitted by said transceiver; and
    a power down device to transition said pager into a sleep mode when a battery is low, said pager periodically awakening to automatically transmit the global positioning system coordinates of said receiver.

* * * * *